Figure 1:
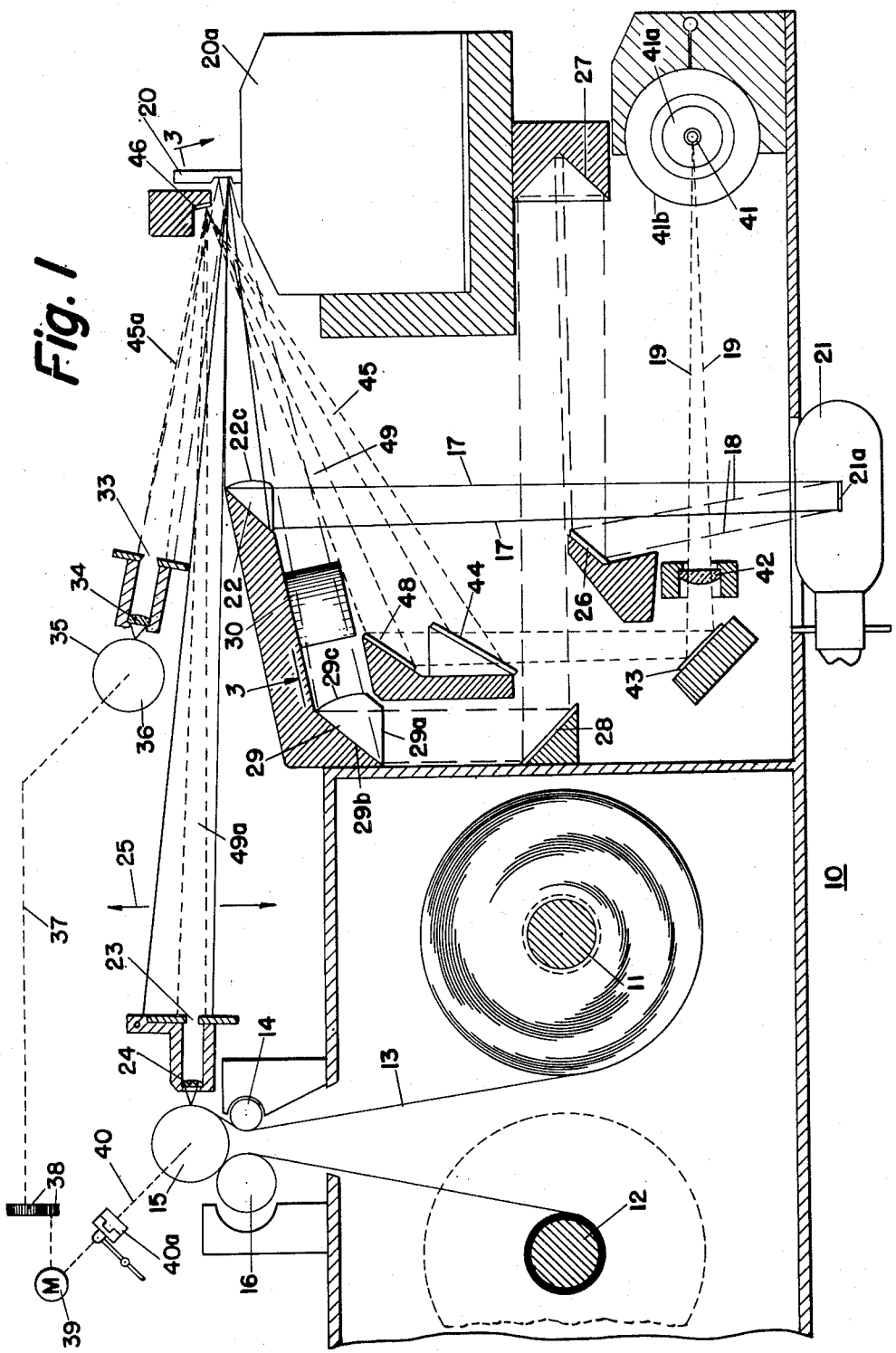

Nov. 21, 1961  J. R. MIDDLETON  3,009,757
RECORDING CAMERA WITH MONITOR FOR SEISMIC WAVES
Filed April 15, 1957  2 Sheets-Sheet 1

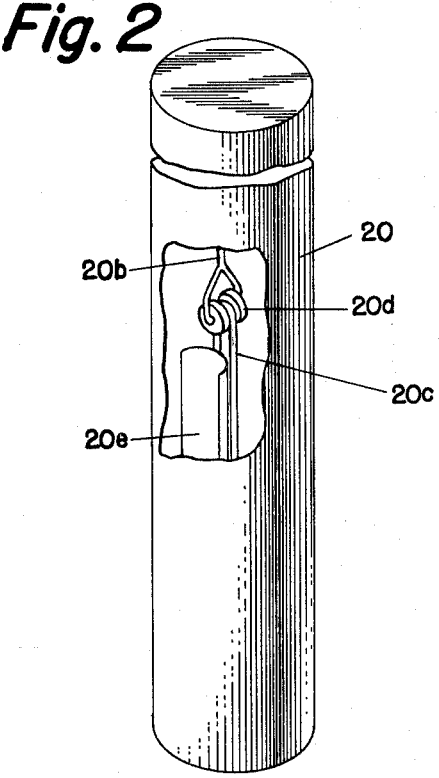
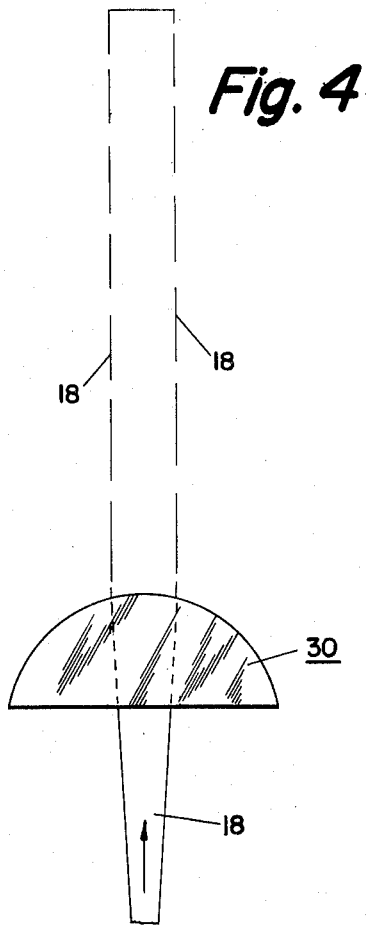
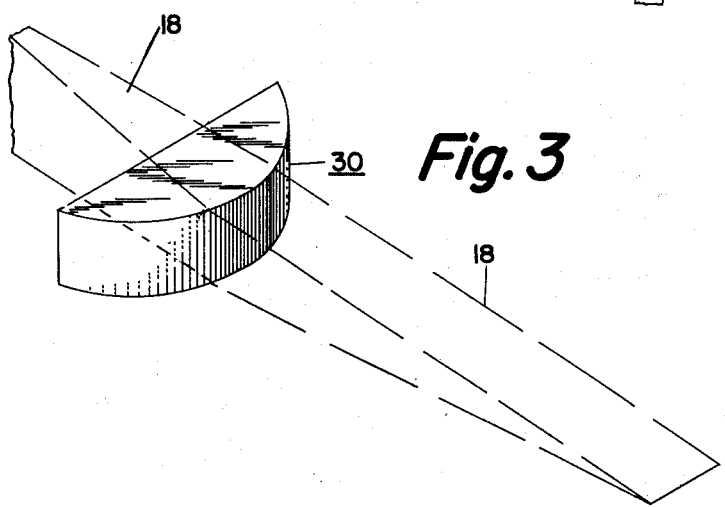

United States Patent Office 3,009,757
Patented Nov. 21, 1961

3,009,757
RECORDING CAMERA WITH MONITOR
FOR SEISMIC WAVES
Jack R. Middleton, Waxahachie, Tex., assignor, by mesne assignments, to Socony Mobil Oil Company, Inc., New York, N.Y., a corporation of New York
Filed Apr. 15, 1957, Ser. No. 652,886
10 Claims. (Cl. 346—1)

This invention relates to seismic apparatus, more particularly to cameras utilized for producing seismograms, and has for an object the simultaneous production of monitoring traces at reduced scale and operable either separately or in conjunction with the production of the seismogram proper.

In conducting seismic surveying, it is frequently desirable to make a plurality of test shots and to examine the records before proceeding with the survey as a whole over the area being explored. In this manner there can be selected the proper settings for the control apparatus including the width of the bandpass and the frequencies to be passed by the filters to the recording equipment. In this manner there is assured the production of seismic records of maximum usefulness in the determination of the subsurface character of the earth under exploration. Heretofore, the initial records in determination of the proper setting of the recording equipment have been in the usual form of seismograms and, accordingly, have been wasteful of recording paper, and in particular, due to their substantial length, they have presented more difficult problems in respect to field development. For example, to develop seismograms of conventional size there is required a substantial quantity of development chemicals. Such chemicals are carried in the field truck along with the seismic recording instruments and create a serious corrosion problem with respect to the instruments.

In accordance with the present invention, miniature seismograms are produced, meaning that the seismic event as a whole is recorded on a relatively short length of recording paper, for example around one foot instead of about three to six feet. Nevertheless, the miniature or monitoring record has a time base which is quite accurate and in scaled relation to that of the seismogram proper. The amplitudes of the trace are likewise in scaled proportion to the seismogram proper, and there are included on the monitor record timing marks as on the principal record.

Further in accordance with the invention, a single galvanometer is utilized for the production of the traces on the principal record and on the monitoring record, the light paths being in general different for the two records but intersecting at the mirror or reflecting surface carried by the galvanometer for each trace.

After a seismic event the monitoring record can be immediately developed in the field and with a minimum of difficulty and will provide the seismic crew with immediate information as to the success of each shot in terms of end results with avoidance of the delays which have been heretofore incident to the development of part or all of a long record in the field. By reason of the substantial reduction in size of the miniature seismograms the requirements for development chemicals in the truck are likewise reduced thus minimizing any corrosion of the instruments due to exposure to such chemicals.

Though the monitoring record itself need only be used while the recording apparatus has been adjusted, it has been found that the miniature or monitor records themselves are of great value, and sufficiently so that both the principal record and the monitoring records will in general be made concurrently.

For further objects and advantages of the invention and for a more detailed understanding thereof, reference is to be had to the following description taken in conjunction with the accompanying drawings, in which:

FIG. 1 diagrammatically illustrates the optical system of the double-duty camera;

FIG. 2 is a perspective view, on enlarged scale, of the galvanometer of FIG. 1 with part of the housing broken away; and FIGS. 3 and 4 are views of the plano cylindrical lens of FIG. 1 and include ray diagrams illustrating the function of the lens.

Referring to the drawings, a camera 10 has been illustrated as of conventional design insofar as the feed roll 11 for a photosensitive strip and the drive roll 15 and the idler roll 16 are concerned. From the feed roll 11 the strip of sensitized paper 13 is drawn over an idler roll 14, with the drive roll 15 being suitably connected to a power source or motor M. The strip 13 is then fed onto a take-up spool 12.

Seismic signals are impressed or recorded on the photosensitive strip 13 by applying appropriate electrical signals to a galvanometer 20 mounted in a conventional galvanometer block 20a which includes a permanent magnet as a flux source. Light (illustrated in FIG. 1 by solid line rays 17), diverging as it travels from a source 21, which source is illustrated in the form of a bulb, is intercepted by a plano convex prism 22 where it is reflected upward to the mirror in galvanometer 20 and thence through aperture 23 and a condensing lens 24 onto the sensitized strip 13. Prism 22 by reason of its convex surface 22c tends to bring the light rays to focus at the mirror of galvanometer 20. Upon reflection such rays tend to diverge over an extended angle whose dimension is indicated by arrows 25 and thus there is required the condensing lens 24 to concentrate such rays to a spot on the chart 13. Insofar as the light path in the dimension of arrows 25 is concerned, conventional practice is followed. However, the light transmission with respect to a dimension normal to the arrow 25 is novel in its relation to a second light path hereinafter to be described, particularly in connection with the construction of the galvanometer 20. In a preferred form, the galvanometer 20 has a cylindrical mirror generally of the type shown as 20e in FIG. 2 in which the galvanometer suspension includes a filament 20b and a coil 20c mutually coupled by an insulating spool 20d. The galvanometer mirror 20e of the form of a section of a cylinder is mounted with the axis thereof parallel to the coil 20c for rotation therewith. Thus the cylindrical mirror 20e has a focal length of its own. The paper 13 is positioned at a point which with respect to the mirror of galvanometer 20, FIG. 1, is the same distance from the mirror of galvanometer 20 as the light source 21. As understood from the conjugate distance rule the image of the filament 21a of source 21 will be focused on the sensitized paper 13 for the production of concentrated spots of light movable in dependence upon the excitation of galvanometer 20 for the production of the conventional full sized seismogram. In practice, such seismograms are often twelve inches in width and three to six feet in length in order to accommodate recordings from twenty-four to thirty or more galvanometers in a side-by-side relationship thereon and to record seismic events occurring over a time interval of two to five seconds. The drive rolls 15 and 16 ordinarily will be adjusted to drive the sensitized strip 13 at a rate of about fifteen inches per second.

In order to permit operation in which seismograms taken one after another with respect to time would be spooled onto take up reel 12 without development thereof over an extended period and at the same time to permit a seismic observer to monitor his work during the course of a day's operations, a second recording is made substantially reduced in size but otherwise in all respects a duplicate of that impressed on recording paper 13 with the same galvanometer 20 being utilized for the dual function of reflecting light onto both a primary record on chart 13 and onto a secondary or monitor record as will now be described.

More particularly, light from filament 21a (illustrated in FIG. 1 by the long dash line rays 18) which strikes mirror 26 is reflected substantially at right angles onto a reflecting prism 27 which reverses the direction of travel of the light whereupon the reflected light impinges on a mirror 28 and upon reflection at right angles is directed to a plano convex prism 29. The incident surface 29a of prism 29 is planar. After reflection at the reflecting surface 29b of prism 29 the light emerges through the convex surface 29c which converges one component of the light beam into a partial image at galvanometer 20 in the same manner as light from the prism 22. The image is a partial image since prism 29 treats divergence in one dimension only. Along the dimension parallel to the length of prism 29, an end view of which is shown in FIG. 1, the light rays continue to be divergent. A plano cylindrical lens 30 is provided to cause the divergent rays emanating from prism 29 to become parallel whereupon the rays travel to the mirror of the galvanometer 20 and thence through a slit or aperture 33 and condensing lens 34 onto a sensitized strip 35 wound on a drum 36. The drum 36 is driven by way of a suitable gear train from the same drive motor as drive roll 15. Since the rays 18 from lens 30 in one dimension are parallel, the sensitized strip 35 may be located at the focal length of the mirror in galvanometer 20. The condensing lens 34 is provided only to compensate for the divergence in the dimension of the axis of the galvanometer mirror. By providing a first recording medium at the conjugate distance of a galvanometer mirror having its own focal length to produce a first recording and by providing means, such as lens 30, for rendering parallel a second set of rays, which ordinarily are diverging, for recording at the focal length of the galvanometer mirror, recordings of different size may be made using a common galvanometer element for both.

Coincidentally with the production of the principal seismogram and the monitoring seismogram, there are placed thereon timing lines which originate at a source 41. This source comprises a light or other source of radiant energy housed in a drum 41a. The drum 41a has longitudinal slots around its periphery and is rotated within an outer stationary drum or casing 41b which has only one longitudinal slot. Rotation of the inner drum 41a interrupts the light rays 19 (illustrated by the short dash lines FIG. 1) leaving the source. The drum 41a is rotated at a speed required to produce a flash of light every one-hundredth of a second. Light rays 19 from the source 41 pass through a cylindrical lens 42 to produce a vertically converging beam, which from reflecting surface 43 is directed to a light splitter 44 which will reflect from its front surface a beam 45 onto a reflecting surface 46 which in turn redirects the light beam indicated by 45a to the aperture 33 and the cylindrical lens 34. The arrangement is such that the light from the source 41 places timing lines across the record and spaced one from the other a distance apart corresponding with one-hundredth of a second in terms of travel time of the recording medium 35.

The light passing through the beam splitter 44 is reflected from the surface 48 as beam 49 to the reflecting surface 46 and thence is directed as beam 49a to the recording medium 15 to place thereon timing lines spaced one from the other by one-hundredth of a second. Obviously, the timing lines can be spaced apart any selected distance corresponding to other arbitrary units of time and other arrangements known to those skilled in the art may be utilized, such for example as making every fifth or tenth line somewhat heavier than the intermediate lines to aid those interpreting seismograms in determining time intervals.

It is to be understood that the sensitized medium on drum 36 may be supplied thereto in roll form as earlier described for the principal seismogram. It may be more convenient, however, to use precut lengths of sensitized strip material which can readily be secured to roll 36 and through a mechanical connection 37 and reduction gearing 38 operated in timed relation with the recording medium 13. A motor 39 is arranged selectively to drive through a transmission 40 and clutch 40a the drive roll 15 in timed relation with the roll 36, or to remain at standstill while only a monitoring record is being made of a seismic event.

While a preferred embodiment of this invention has been illustrated, it is to be understood that other modifications thereof may be made within the scope of the appended claims.

What is claimed is:

1. A dual recording seismic camera comprising a light source, galvanometer means including a mirror having a finite focal length and adapted for deflection in accordance with a seismic signal, a first optical path including optical elements for directing a first beam of light from said source to said galvanometer mirror, recording means disposed to receive the reflection of said first beam from said mirror for production of a permanent seismic record of predetermined size, a second optical path including optical elements for directing a second beam of light from said source to said galvanometer mirror, and second recording means disposed at a distance from said mirror corresponding to the focal length of said mirror to receive the reflection of said second beam from said mirror to produce a duplicate of said seismic record but of different size.

2. A dual recording seismic camera according to claim 1 wherein said second optical path includes an optical element intermediate said light source and said mirror for directing said second beam to said mirror as parallel rays.

3. The method of monitoring a seismic survey comprising producing a seismic signal, deflecting the mirror of a galvanometer in accordance with said signal, directing a beam of light along an optical path to bring the rays of the beam to focus on the mirror of the galvanometer for production at a first distance therefrom a permanent seismic record of predetermined size of said signal, concurrently directing a second beam of light along an optical path to the mirror of the galvanometer, converting the rays comprising said second beam of light from normally divergent rays to parallel rays before they are received by the mirror, reflecting said second beam from the galvanometer mirror, focusing said second beam of light to produce at a second distance therefrom shorter than said first distance a permanent seismic record in miniature of said first-named permanent seismic record.

4. Apparatus for monitoring the signals of a seismic survey comprising galvanometer means responsive to said signals and including a mirror having a finite focal length and movable in accordance with said signals, means for directing a beam of light along an optical path to bring the rays of the beam to said mirror of said galvanometer for production on a sensitized medium disposed at a distance therefrom greater than the focal length of said mirror of a permanent seismic record of predetermined size of said signals, means for concurrently directing a second beam of light along another optical path to said mirror of said galvanometer, means in said second optical path for converting the rays comprising said second beam of light from normally divergent rays to parallel rays before they are received by said mirror, and a second sensitized medium for receiving the reflections of said second beam from the galvanometer mirror, said second medium being disposed at a distance from said mirror corresponding with the focal length of said mirror for production of a permanent seismic record in miniature of said first-named permanent seismic record.

5. A seismic camera for recording a signal on two mediums identical in character but in different dimensional relationships which comprises a light source, a galvanometer adapted to be energized in dependence upon said signal and having a mirror of finite focal length positioned with respect to one of said mediums a distance which is the conjugate of the distance to said light source, means for positioning the second of said mediums at the focal distance from said mirror, and means intermediate said light source and said mirror for directing beams of light to said mirror over two separate paths, one of said beams being comprised at least in part of parallel rays.

6. A seismic camera for recording a signal on two mediums identical in character but in different dimensional relationships which comprises a light source, galvanometer means including a mirror adapted for deflection in accordance with said signal, said mirror having a finite focal length and being positioned with respect to one of said mediums a distance which is the conjugate of the distance to said light source, means for positioning the second of said mediums at the focal distance from said mirror, a first optical path including optical elements for directing a first beam of light from said source to said galvanometer mirror, a second optical path including optical elements for directing a second beam of light from said source to said galvanometer mirror, and one of said optical elements in one of said paths having the characteristic of converting diverging rays in one of said beams of light to parallel rays before they are received by the said mirror to produce on the second of said mediums a seismic record in miniature of the seismic record produced on the other of said mediums.

7. The method of monitoring a seismic survey comprising the steps of producing a seismic signal, deflecting the mirror of a galvanometer in accordance with said signal, directing a beam of light along an optical path to the mirror of the galvanometer to produce at a first location a predetermined distance from said mirror a permanent seismic record of predetermined size of said signal, concurrently directing a second beam of light along a different optical path toward the mirror of the galvanometer, modifying said second beam of light to produce parallel rays of light, reflecting said second beam from the galvanometer mirror, focusing said second beam to produce at a second location which is a shorter distance from the mirror than said first location a permanent seismic record in miniature of said first-named permanent seismic record.

8. The method of monitoring a seismic survey comprising the steps of producing a seismic signal, deflecting the mirror of a galvanometer in accordance with said signal, directing a beam of light along an optical path to the mirror of the galvanometer to produce at a first location a predetermined distance from said mirror a permanent seismic record of predetermined size of said signal, concurrently directing a second beam of light along a different optical path toward the mirror of the galvanometer, and reflecting said second beam from the galvanometer mirror, focusing said second beam to produce at a second location different from said first location a second permanent seismic record of different size from said first-named permanent seismic record.

9. The method of monitoring a seismic survey comprising the steps of producing a seismic signal, deflecting the mirror of a galvanometer in accordance with said signal, directing a beam of light along an optical path to the mirror of the galvanometer from a source located a finite distance from the galvanometer mirror to produce at a distance from the mirror which is the conjugate of the distance from the mirror to the light source a permanent seismic record of predetermined size of said signal, concurrently directing a second beam of light along a different optical path to the mirror and effectively originating from a source an infinite distance from the mirror, and reflecting said second beam of light from the galvanometer mirror, focusing said second beam of light to produce at a distance from said mirror different from said first-named distance a permanent seismic record of a size different from the first-named permanent seismic record.

10. A seismic camera for recording a signal on two mediums identical in character but in different dimensional relationships which comprises a light source, a galvanometer adapted to be energized in dependence upon said signal and having a mirror movable in accordance with said signal, means for directing a beam of light along an optical path to bring the rays of the beam to means comprising said mirror for production of a first reflected beam of light and for production by said beam on a sensitive medium disposed a predetermined distance from said mirror of a permanent seismic record of predetermined size of said signal, said means comprising said mirror being located a finite distance from said light source and having a finite focal length, means for concurrently directing a second beam of light along another optical path to said means comprising said mirror, means in said second optical path for converting the rays comprising said second beam of light from normally divergent rays to parallel rays before they are received by said mirror, and a second sensitized medium for receiving reflections of said second beam from said mirror, said second medium being disposed at a distance corresponding with the focal length of said means comprising said mirror for production of a permanent seismic record in miniature of said first-named permanent seismic record.

References Cited in the file of this patent
UNITED STATES PATENTS

| | | |
|---|---|---|
| 2,474,303 | Davis | June 28, 1942 |
| 2,620,890 | Lee et al. | Dec. 9, 1952 |
| 2,645,552 | Stevinson | July 14, 1955 |
| 2,816,002 | Baranowski et al. | Dec. 10, 1957 |
| 2,871,089 | Loper et al. | Jan. 27, 1959 |

OTHER REFERENCES

"Geophysics," vol. XX, No. 3, July 1955, pages 585–592.